United States Patent [19]

Tsai

[11] Patent Number: 5,460,393
[45] Date of Patent: Oct. 24, 1995

[54] EXTENDABLE HANDLE FOR A LUGGAGE

[76] Inventor: Chin H. Tsai, P.O. Box 82-144, Taipei, Taiwan

[21] Appl. No.: 297,649

[22] Filed: Aug. 26, 1994

[51] Int. Cl.⁶ .................................................. B62B 1/04
[52] U.S. Cl. .......................... 280/655; 16/15; 190/18 A; 280/47.315
[58] Field of Search .................. 403/108, 109; 190/18 A:115, 116; 280/37, 655, 655.1, 654, 471.17, 47.18, 47.27, 47.315, 47.371; 16/115

[56] References Cited

U.S. PATENT DOCUMENTS

| | | | |
|---|---|---|---|
| 1,481,981 | 1/1924 | Boye | 403/109 |
| 3,811,455 | 5/1974 | Thur | 403/109 |
| 4,407,521 | 10/1983 | Zeitlin | 280/655 |
| 4,546,995 | 10/1985 | Kassai | 280/655 |
| 5,323,886 | 6/1994 | Chen | 280/655 |
| 5,397,151 | 3/1995 | Jserng | 280/47.27 |

Primary Examiner—Anne M. Boehler
Attorney, Agent, or Firm—Alfred Lei

[57] ABSTRACT

An extendable handle for a luggage including two parallel side rails each including an inner telescopic member, a sleeve having a cylindrical portion at an upper part and a semi-cylindrical portion at a lower part, a plug having an upper cylindrical portion and a lower cylindrical portion having a larger outer diameter than the upper cylindrical portion. The upper cylindrical portion is fitted into a lower end of the inner telescopic member, the lower cylindrical portion having a slot which divides the lower cylindrical portion into two legs. The legs are provided at an outer side with a plurality of hemispherical protuberances adapted to the cavities of the sleeve, and an outer telescopic member has an upper end in which is inserted the sleeve. The outer telescopic member has a tongue adapted to engage with the recess of the sleeve.

3 Claims, 6 Drawing Sheets

5,460,393

EXTENDABLE HANDLE FOR A LUGGAGE

BACKGROUND OF THE INVENTION

It has been found that the conventional extendable handle for a luggage is inconvenient to use and has a lot of drawbacks.

FIGS. 6, 6A and 6B illustrate a conventional extendable handle which includes a pair of inner telescopic members 72, a handle grip 70, a pair of outer telescopic members 71, a pair of sleeves 73, a pair of springs 74, and a pair of buttons 75. The button 75 is connected with the spring 74 and fitted in the hole 711 of the outer telescopic member 71. However, it is necessary to press the left and right buttons 75 in order to pull the inner telescopic members 72 thereby causing much inconvenience in use. In addition, when the springs 74 are fatigued, the inner telescopic members 72 will not be able to be kept at a fixed position hence losing their function.

Therefore, it is an object of the present invention to provide an extendable handle for a luggage which may obviate and mitigate the above-mentioned drawbacks.

SUMMARY OF THE INVENTION

This invention relates to an improved extendable handle for a luggage.

It is the primary object of the present invention to provide an extendable handle for a luggage which is convenient in operation.

It is another object of the present invention to provide an extendable handle for a luggage which is simple in construction.

It is still another object of the present invention to provide an extendable handle for a luggage which is easy to manufacture.

It is still another object of the present invention to provide an extendable handle for a luggage which is low in cost.

It is a further object of the present invention to provide an extendable handle for a luggage which is practical in use.

The other objects and merits and a fuller understanding of the present invention will be obtained by those having ordinary skill in the art when the following detailed description is read in conjunction with the accompanying drawings wherein like numerals refer to like or similar part.

DETAILED DESCRIPTION OF THE PREFERRED EMBODIMENT

Figure 1:
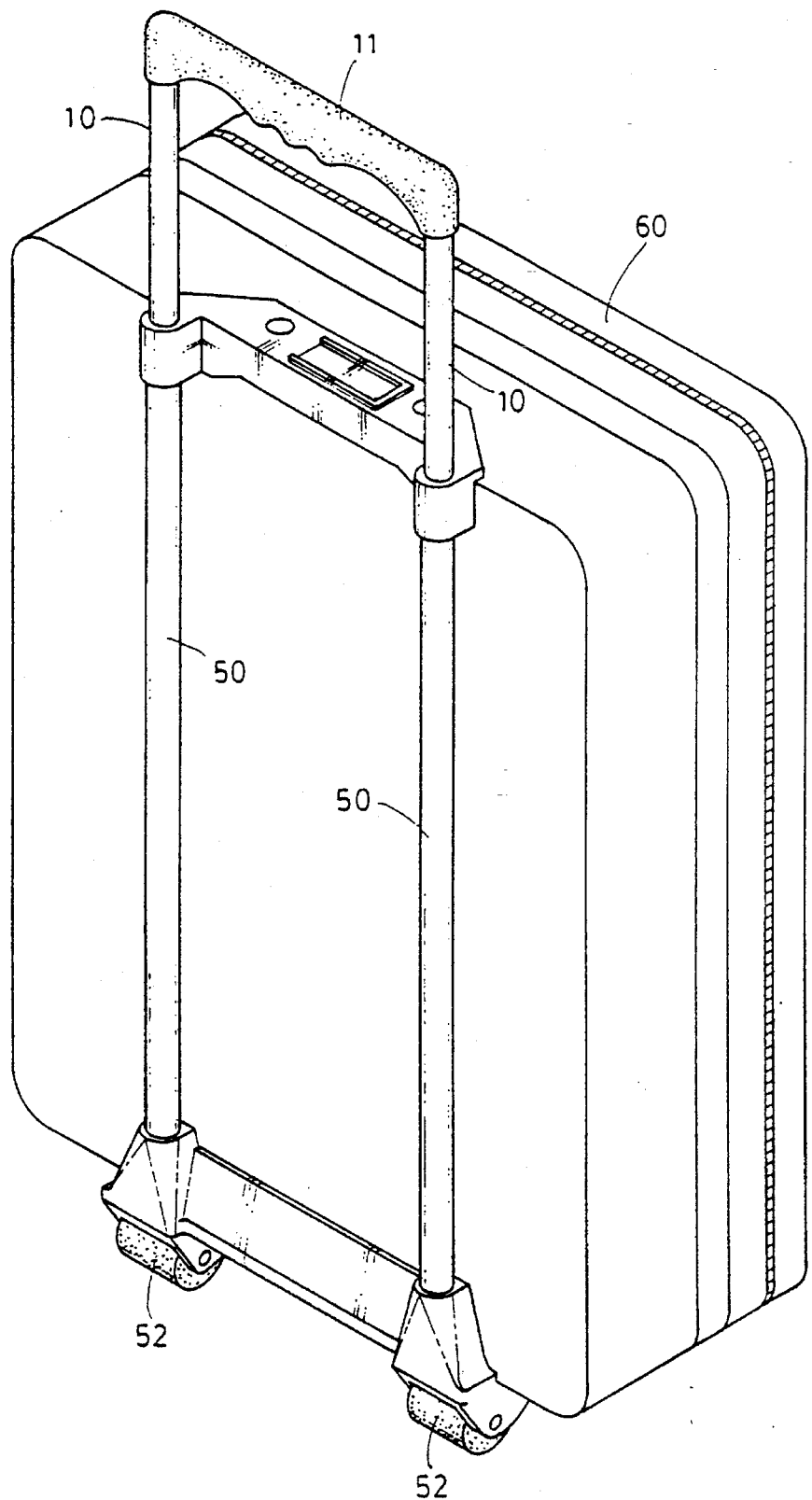
FIG. 1 is a perspective view of a luggage provided with an extendable handle according to the present invention.

For the purpose of promoting an understanding of the principles of the invention, reference will now be made to embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
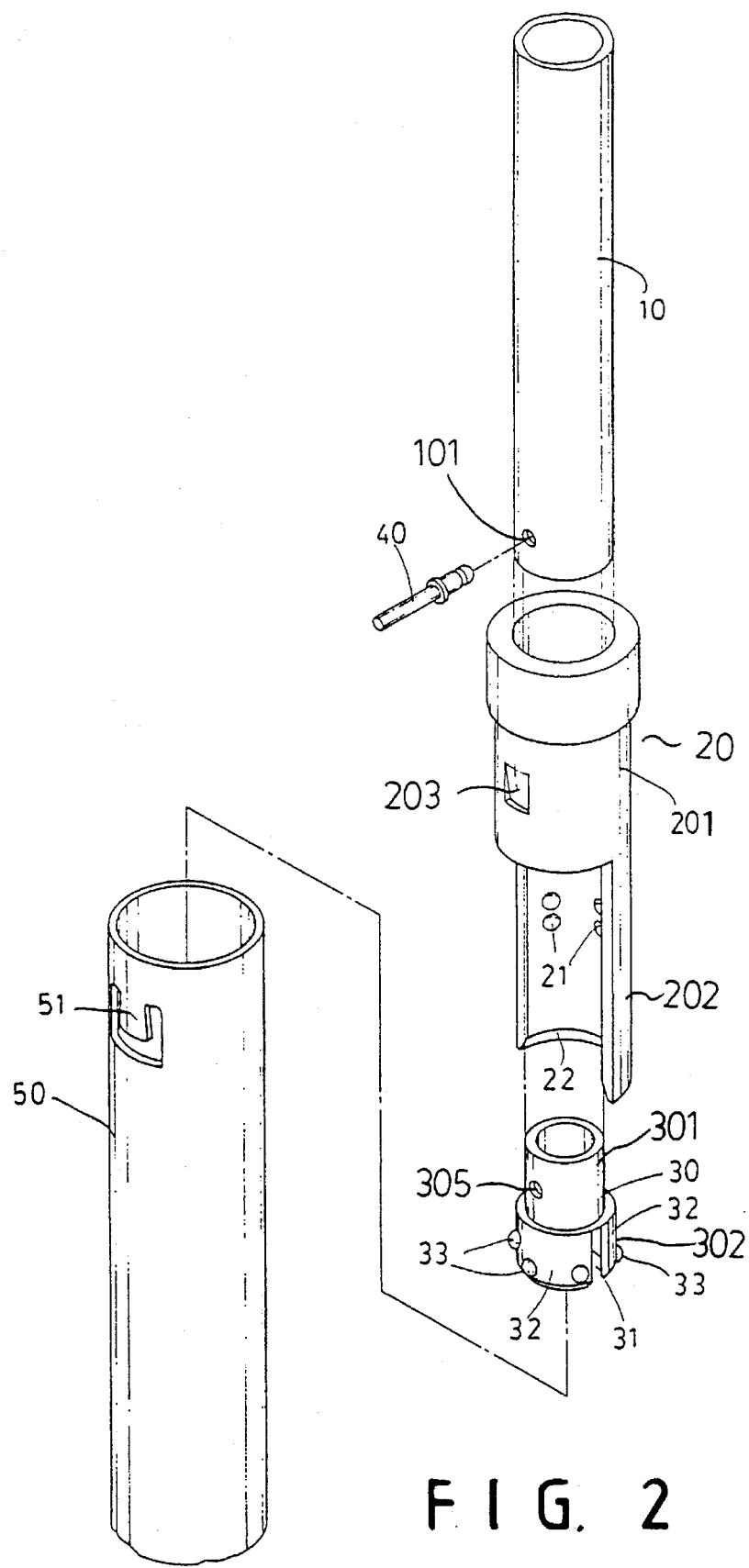
FIG. 2 is an exploded view of a side rail of the extendable handle.
Figure 3:
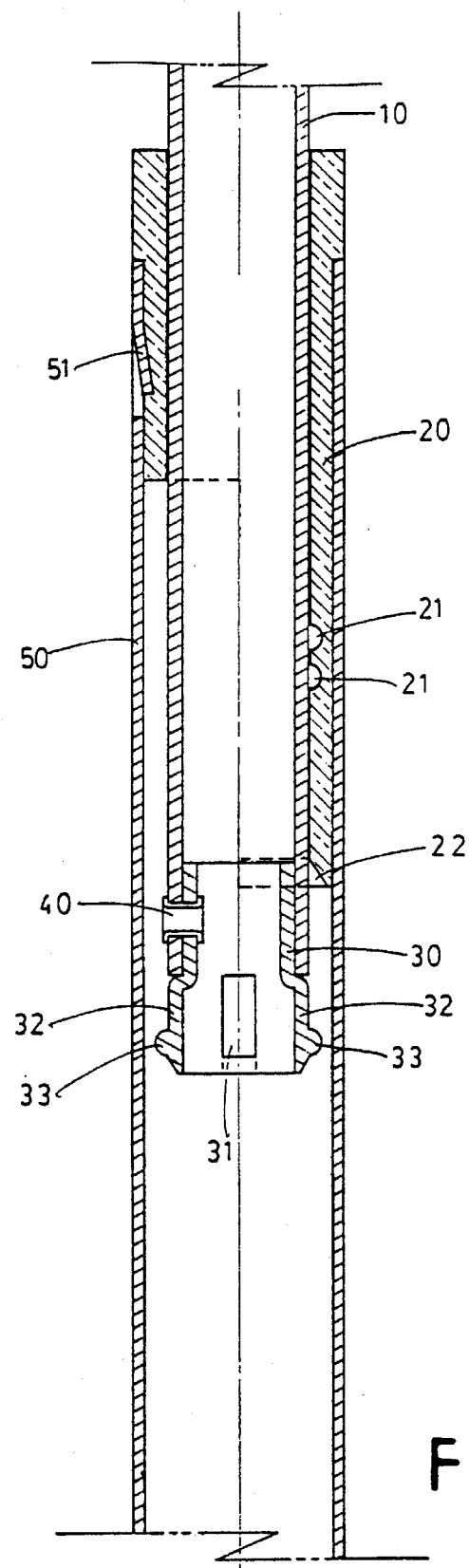
FIG. 3 is a sectional view of the side rail.

With reference to the drawings and in particular to FIGS. 1, 2 and 3 thereof, the extendable handle according to the present invention comprises two parallel side rails. Each side rail includes an inner telescopic member 10, a sleeve 20, a plug 30, a locking pin 40, and an outer telescopic member 50. A handle grip 11 is connected to the inner telescopic members 10 at their free ends.

As illustrated in FIG. 2, the inner telescopic member 10 is a tubular member formed with a hole 101 at the lower end and inserted into the sleeve 20.

The sleeve 20 is also a tubular member having a cylindrical portion 201 at the upper part and a semi-cylindrical portion 202 at the lower part. Further, the cylindrical portion 202 has a recess 203 at the outer side, while the semi-cylindrical portion 202 is formed at the inner side with a plurality of cavities 21 and a conical surface 22 at the lower edge.

The plug 30 is also a tubular member having an upper cylindrical portion 301 and a lower cylindrical portion 302 having a larger outer diameter than the upper cylindrical portion 302. The upper cylindrical portion 301 is adapted to fit into the lower end of the inner telescopic member 10 and has a hole 305. The lower cylindrical portion 302 has a slot 31 which divides the lower cylindrical portion 302 into two legs 32. Further, the outer side of the legs 32 is provided with a plurality of hemispherical protuberances 33 adapted to the cavities 21 of the sleeve 20.

The sleeve 20 is fitted in the upper end of the outer telescopic member 50 which has a tongue 51 adapted to engage with the recess 203 of the sleeve 20.

In assembly (see FIGS. 2 and 3), the lower end of the inner telescopic member 10 is inserted in the sleeve 20 and fixedly connected with the plug 30 by a rivet 40 extending through the hole 101 of the inner telescopic member 10 and the hole 305 of the plug 30. Then, the sleeve 20 is inserted into the outer telescopic member 50 and the tongue 51 of the outer telescopic member 50 is pressed into the recess 203 of the sleeve 20 thereby keeping them together.

Further, the outer telescopic member 50 is provided with a castor 52 at the lower end (see FIG. 1).

Figure 4:
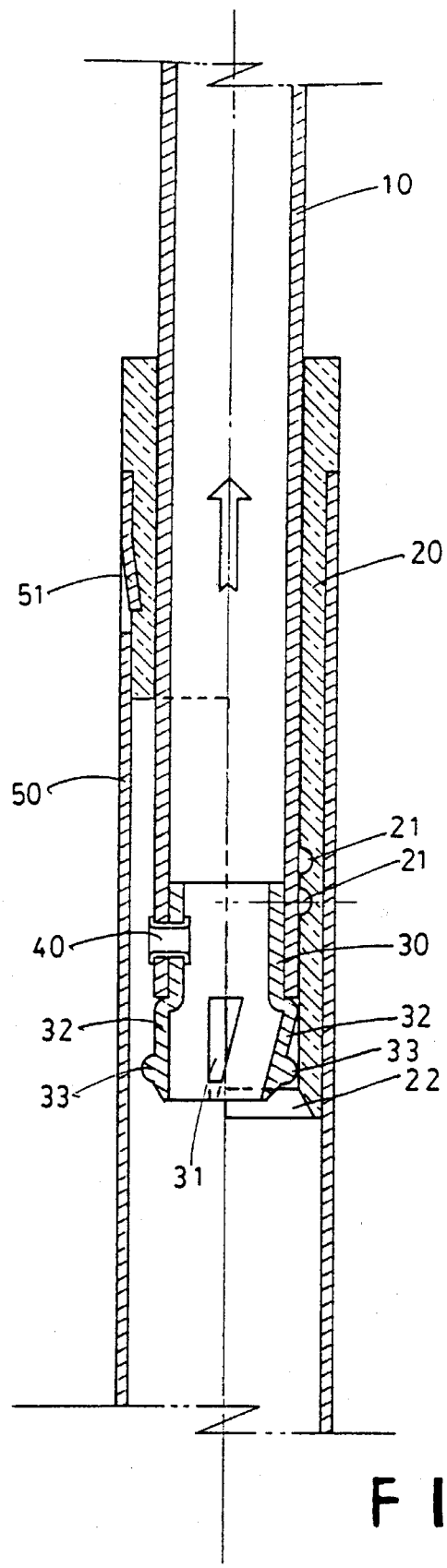
FIGS. 4 and 5 show the working principle of the extendable handle.
Figures 5, 5A:
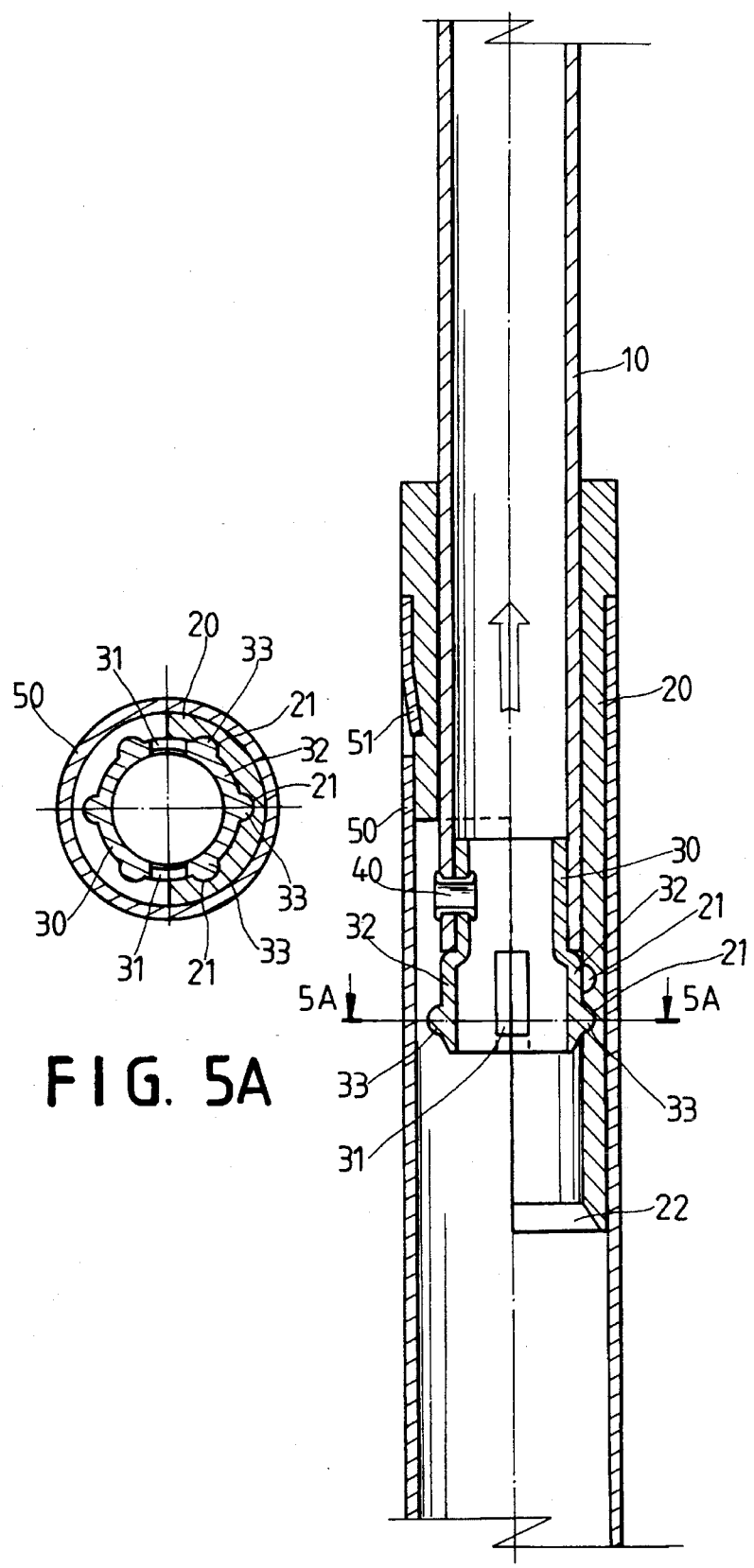
FIG. 5A is a sectional view taken along line 5A—5A of FIG. 5.
Figure 6:
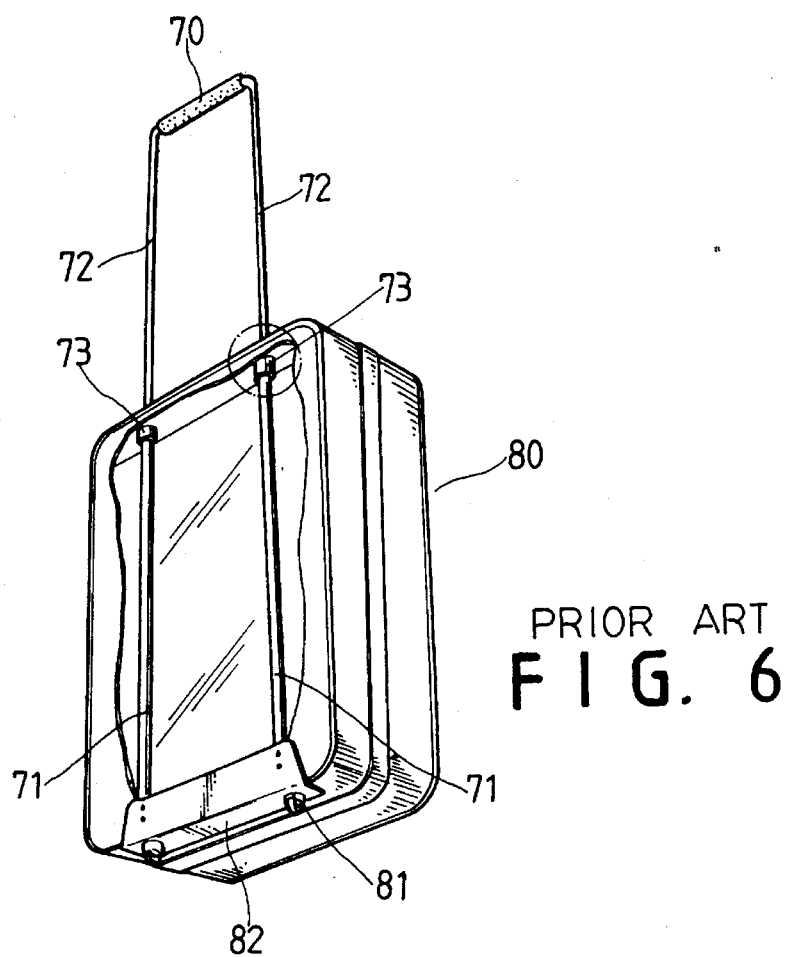
FIG. 6 is a perspective view of a luggage provided with a prior art extendable handle.
Figure 6A:
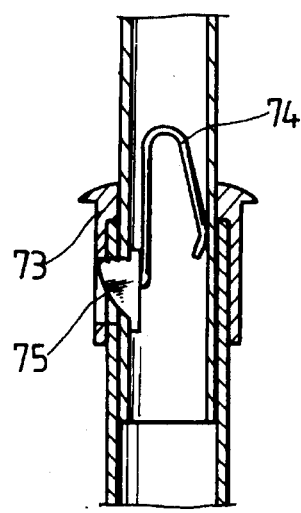
FIGS. 6A and 6B show the working principle of the prior art extendable handle.
Figure 6B:
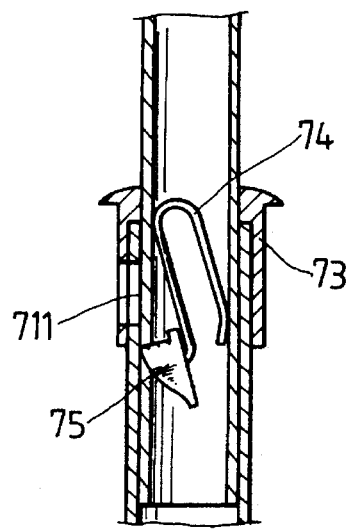

FIGS. 4 and 5 illustrate the working principle of the present invention. FIG. 5A is a sectional view taken along line 5A—5A of FIG. 5.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An extendable handle for a luggage comprising:
   two parallel side rails each including:
   an inner telescopic member;
   a sleeve having a cylindrical portion at an upper part and a semi-cylindrical portion at a lower part, said cylindrical portion having a recess at an outer side, said semi-cylindrical portion being formed at an inner side with a plurality of cavities and a conical surface at a lower edge;

a plug having an upper cylindrical portion and a lower cylindrical portion having a larger outer diameter than the upper cylindrical portion, said upper cylindrical portion being fitted into a lower end of said inner telescopic member, said lower cylindrical portion having a slot which divides the lower cylindrical portion into two legs, said legs being provided at an outer side with a plurality of hemispherical protuberances adapted to the cavities of said sleeve; and an outer telescopic member having an upper end in which is inserted said sleeve, said outer telescopic member having a tongue adapted to engage with the recess of said sleeve.

2. An extendable handle for a luggage as claimed in claim 1, wherein said outer telescopic member is provided with a castor at a lower end.

3. An extendable handle for a luggage as claimed in claim 1, wherein the upper cylindrical portion of said plug is connected by a rivet.

* * * * *